(12) United States Patent
Furukawa et al.

(10) Patent No.: US 10,389,952 B2
(45) Date of Patent: Aug. 20, 2019

(54) IMAGE-PROCESSING DEVICE WHICH GENERATES A HIGH-RESOLUTION IMAGE BY COMBINING IMAGES, IMAGING DEVICE, IMAGE-PROCESSING METHOD, AND STORAGE-MEDIUM

(71) Applicant: OLYMPUS CORPORATION, Hachioji-shi, Tokyo (JP)

(72) Inventors: Eiji Furukawa, Saitama (JP); Kosuke Kajimura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/819,968

(22) Filed: Nov. 21, 2017

(65) Prior Publication Data

US 2018/0077360 A1 Mar. 15, 2018

Related U.S. Application Data

(63) Continuation of application No. PCT/JP2015/068133, filed on Jun. 24, 2015.

(51) Int. Cl.
*H04N 5/265* (2006.01)
*G06T 7/11* (2017.01)
(Continued)

(52) U.S. Cl.
CPC ........... *H04N 5/265* (2013.01); *G06T 3/4053* (2013.01); *G06T 5/20* (2013.01); *G06T 7/11* (2017.01); *G06T 2207/20216* (2013.01)

(58) Field of Classification Search
CPC ......... H04N 5/265; G06T 3/4053; G06T 7/11; G06T 5/20; G06T 2207/20216
See application file for complete search history.

(56) References Cited

U.S. PATENT DOCUMENTS 6,429,895 B1  8/2002  Onuki
2002/0097324 A1  7/2002  Onuki
(Continued)

FOREIGN PATENT DOCUMENTS

JP  10191136 A  7/1998
JP  2007243917 A  9/2007
(Continued)

OTHER PUBLICATIONS

International Search Report (ISR) and Written Opinion dated Sep. 1, 2015 issued in International Application No. PCT/JP2015/068133.

*Primary Examiner* — Padma Haliyur
(74) *Attorney, Agent, or Firm* — Holtz, Holtz & Volek PC

(57) ABSTRACT

An image-processing device includes a high-resolution combining portion that generates a combined image by combining a standard image and at least one reference image, which are acquired by capturing images of a subject in time series by using an imaging element in which multiple types of color filters are arrayed in individual pixels, in a high-resolution space where the resolution is greater than those of the standard image and the reference images. The image-processing device also includes a position-displacement-distribution calculating portion that calculates a distribution of position displacements between two comparative images that are individually formed of pixels corresponding to the different types of color filters in the generated combined image, a correlation-level calculating portion that calculates, for individual pixels, correlation levels between the two comparative images based on the calculated distribution, and an image correcting portion that corrects the combined image based on the calculated correlation levels.

18 Claims, 15 Drawing Sheets

(51) Int. Cl.
*G06T 5/20* (2006.01)
*G06T 3/40* (2006.01)

(56) References Cited

U.S. PATENT DOCUMENTS

| | | |
|---|---|---|
| 2010/0128928 A1 | 5/2010 | Ishiwatari |
| 2011/0199507 A1 | 8/2011 | Ito |
| 2012/0269444 A1 | 10/2012 | Naito |
| 2013/0301881 A1 | 11/2013 | Ishiwatari |
| 2015/0161773 A1* | 6/2015 | Takahashi ............ H04N 5/2171 382/173 |

FOREIGN PATENT DOCUMENTS

| | | |
|---|---|---|
| JP | 2010130291 A | 6/2010 |
| JP | 2011128834 A | 6/2011 |
| JP | 2011199786 A | 10/2011 |
| JP | 2012230486 A | 11/2012 |
| JP | 2015076796 A | 4/2015 |
| WO | 2015053080 A1 | 4/2015 |

\* cited by examiner

FIG. 2

Gr CHANNEL

| Gr4 | | Gr3 | | Gr4 | | Gr3 | |
|---|---|---|---|---|---|---|---|
| | Gr8 | | Gr7 | | Gr8 | | Gr7 |
| Gr2 | | Gr1 | | Gr2 | | Gr1 | |
| | Gr6 | | Gr5 | | Gr6 | | Gr5 |
| Gr4 | | Gr3 | | Gr4 | | Gr3 | |
| | Gr8 | | Gr7 | | Gr8 | | Gr7 |
| Gr2 | | Gr1 | | Gr2 | | Gr1 | |
| | Gr6 | | Gr5 | | Gr6 | | Gr5 |

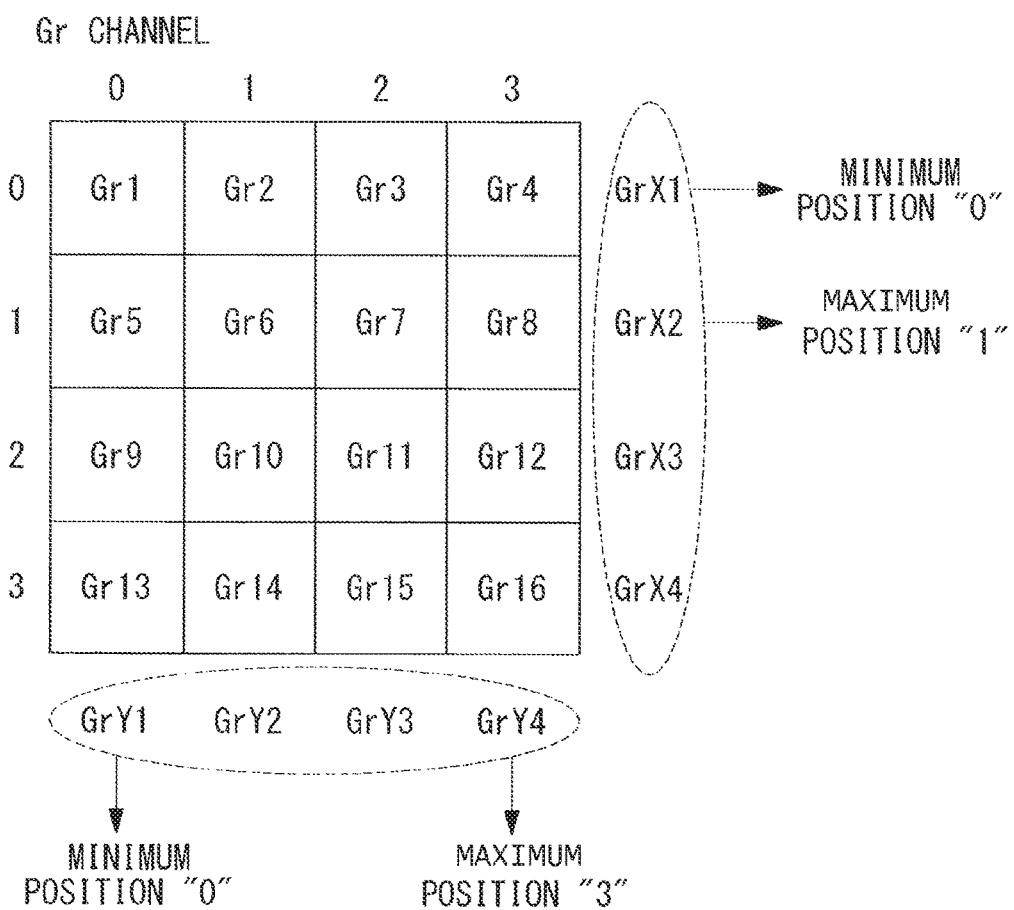

○ ADD UP WITHIN BOUNDARY

○ TAKE AVERAGE WITHIN BOUNDARY

IMAGE-PROCESSING DEVICE WHICH GENERATES A HIGH-RESOLUTION IMAGE BY COMBINING IMAGES, IMAGING DEVICE, IMAGE-PROCESSING METHOD, AND STORAGE-MEDIUM

CROSS-REFERENCE TO RELATED APPLICATIONS

This is a continuation of International Application PCT/JP2015/068133, with an international filing date of Jun. 24, 2015, which is hereby incorporated by reference herein in its entirety.

TECHNICAL FIELD

The present invention relates to an image-processing device, an imaging device, an image-processing method, and a storage medium.

BACKGROUND ART

As a technology for achieving a high resolution by combining images, for example, there is a known method in which a plurality of images are captured by shifting an image sensor in a direction orthogonal to an optical axis, and those images are combined. A technology for suppressing artifacts, such as ghosts occurring in a region in which an imaging subject is moved, when a high-resolution image is acquired by using this method has been disclosed (for example, see Patent Literature 1).

With this technology, similarities among the plurality of images are calculated, and combining ratios among the images are controlled on the basis of the similarities. In other words, one of the plurality of captured images is used as a standard image, the rest of images are used as reference images, differences between the standard image and the reference images are calculated for individual regions, and the similarities between the two types of images are determined on the basis of the differences. Then, the combining ratios of the reference images are increased in regions in which the similarities are high, and the combining ratio of the standard image is increased in regions in which the similarities are low, thereby suppressing the occurrence of artifacts due to movement and position displacement of the imaging subject.

CITATION LIST

Patent Literature

{PTL 1} Japanese Unexamined Patent Application, Publication No. 2011-199786

SUMMARY OF INVENTION

An aspect of the present invention is an image-processing device including: a high-resolution combining portion that generates a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating portion that calculates a distribution of position displacements between two comparative images that are individually formed of pixels corresponding to the different types of color filters in the combined image generated by the high-resolution combining portion; a correlation-level calculating portion that calculates, for individual pixels, correlation levels between the two comparative images on the basis of the distribution of the position displacements calculated by the position-displacement-distribution calculating portion; and an image correcting portion that corrects the combined image on the basis of the correlation levels calculated by the correlation-level calculating portion.

Another aspect of the present invention is an imaging device including an image-acquisition portion that acquires a standard image and one or more reference images other than the standard image by capturing images of an imaging subject in time series by using an imaging element in which multiple types of color filters are arrayed in individual pixels; and the above-described image-processing device that processes the standard image and the reference images acquired by the image-acquisition portion.

Another aspect of the present invention is an image-processing method including: a high-resolution combining step of generating a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating step of calculating a distribution of position displacements between two comparative images that are individually formed of pixels corresponding to the different types of color filters in the combined image generated in the high-resolution combining step; a correlation-level calculating step of calculating, for individual pixels, correlation levels between the two comparative images on the basis of the distribution of the position displacements calculated in the position-displacement-distribution calculating step; and an image correcting step of correcting the combined image on the basis of the correlation levels calculated in the correlation-level calculating step.

Another aspect of the present invention is a non-transitory computer-readable storage medium storing an image-processing program that causes a computer to execute: a high-resolution combining step of generating a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating step of calculating a distribution of position displacements between two comparative images that are individually formed of pixels corresponding to the different types of color filters in the combined image generated in the high-resolution combining step; a correlation-level calculating step of calculating, for individual pixels, correlation levels between the two comparative images on the basis of the distribution of the position displacements calculated in the position-displacement-distribution calculating step; and an image correcting step of correcting the combined image on the basis of the correlation levels calculated in the correlation-level calculating step.

BRIEF DESCRIPTION OF DRAWINGS

FIG. 2 is a diagram showing an example of a Gr-channel high-resolution image generated by an image-processing device of the imaging device in FIG. 1.

FIG. 3A is a diagram showing an example of a region of interest formed of a 4×4-pixel small region in an all-pixel interpolated image, in which interpolation is applied to the Gr-channel high-resolution image in FIG. 2, and also showing the relationship with respect to the sum of the pixels.

DESCRIPTION OF EMBODIMENT

An image-processing device 3 and an imaging device 1 according to an embodiment of the present invention will be described below with reference to the drawings.

Figure 1:
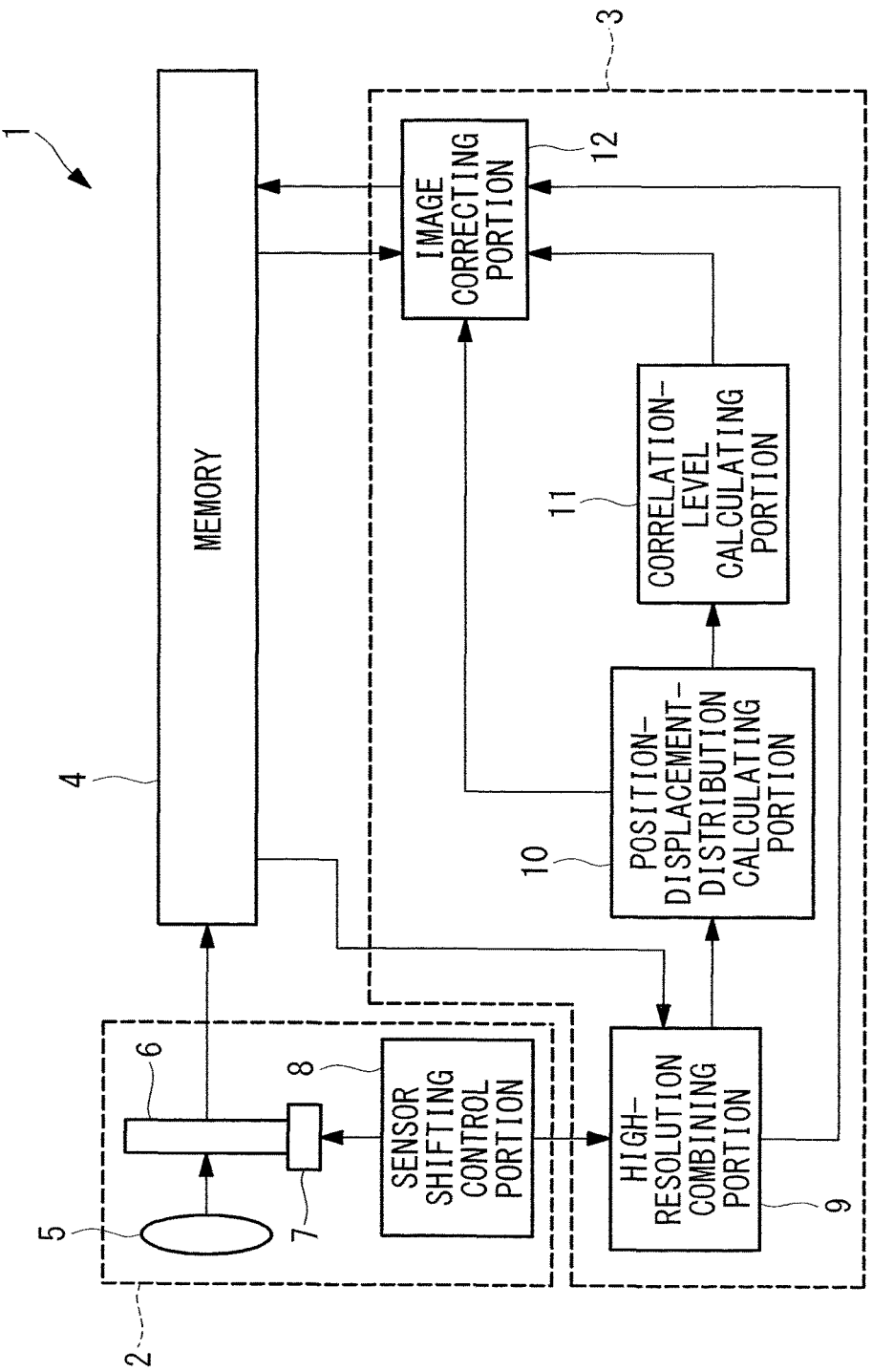
FIG. 1 is a block diagram showing an imaging device according to an embodiment of the present invention.

As shown in FIG. 1, the imaging device 1 according to this embodiment is provided with: an image-acquisition portion 2 that acquires an image by capturing an image of an imaging subject; a memory 4 that stores the image acquired by the image-acquisition portion 2; and an image-processing device 3 that processes the image stored in the memory 4.

The image-acquisition portion 2 is provided with: an image-capturing lens 5 that focuses light coming from the imaging subject; an imaging element 6 into which the light focused by the image-capturing lens 5 enters and that captures an optical image of the imaging subject; a sensor shifting mechanism 7 that shifts the imaging element 6 in a pixel-arraying direction on a sub-pixel basis; and a sensor shifting control portion 8 that controls the direction in which and the amount by which the sensor shifting mechanism 7 shifts the imaging element 6.

The imaging element 6 has a so-called Bayer-array structure in which four types of color filters R, Gr, Gb, and B are disposed at each pixel in a 2×2 pixel unit. The images acquired by the imaging element 6 are a standard image that is acquired first and one or more reference images that are subsequently acquired by shifting the imaging element 6, and are stored in the memory 4.

The image-processing device 3 according to the embodiment of the present invention is provided with: a high-resolution combining portion 9 that generates a high-resolution combined image on the basis of the standard image and the one or more reference images stored in the memory 4; a position-displacement-distribution calculating portion 10 that calculates a distribution of position displacements from the combined image; a correlation-level calculating portion 11, that calculates a correlation level on the basis of the calculated position-displacement distribution; and an image correcting portion 12 that corrects the combined image on the basis of the calculated correlation level.

The high-resolution combining portion 9 is configured so as to receive as inputs the standard image and the reference images from the memory 4, and shift control information for the imaging element 6 input from the sensor shifting control portion 8. The high-resolution combining portion 9 places the input standard image and reference images in a high-resolution image space in accordance with color channels (R, Gr, Gb, and B), while positioning the input standard image and reference images on the basis of the input shift control information (the shift amount and the shift direction).

Specifically, first, individual pixels of the standard image are placed in the high-resolution image space, and the individual pixels of the reference images are subsequently placed in the high-resolution image space on the basis of the shift amount and the shift direction with respect to the standard image. When placing the pixels, if pixels having the same color as the pixels to be placed are already placed in the pixels of the standard image or the pixels of other reference images, it is not necessary to newly place the pixels, or pixel values may be updated by averaging the pixels to be placed and the pixels that are already in place. In addition, the result of cumulative addition may be normalized by the number of times addition has been performed.

In addition, after placing all of the pixels, the high-resolution combining portion 9 may fill the gaps by performing interpolation for pixels that have not been placed yet. Regarding the interpolation method, for example, direction-differentiating interpolation, in which an edge direction is taken into consideration, may be applied by using pixels placed in the periphery, or interpolation may be performed by copying the nearest pixel. FIG. 2 shows a Gr-channel combined image. In addition, combined images are generated for the R, Gb, and B channels. In the figure, hatched pixels indicate pixels generated by means of interpolation, and other pixels indicate pixels that are placed thereat.

In the example shown in FIG. 2, the combined image is generated by combining a total of eight images, including one standard image and seven reference images. Numbers associated with Gr in the figure indicate the order in which the images are captured. With regard to arraying directions of the pixels, for the sake of convenience, the lateral direction is referred to as the horizontal direction, and the longitudinal direction is referred to as the vertical direction.

1: the standard image
2: 1 pixel in the horizontal direction and 0 pixel in the vertical direction with respect to the standard image 3: 0 pixel in the horizontal direction and 1 pixel in the vertical direction with respect to the standard image
4: 1 pixel in the horizontal direction and 1 pixel in the vertical direction with respect to the standard image
5: 0.5 pixel in the horizontal direction and 0.5 pixel in the vertical direction with respect to the standard image
6: 1.5 pixel in the horizontal direction and 0.5 pixel in the vertical direction with respect to the standard image
7: 0.5 pixel in the horizontal direction and 1.5 pixel in the vertical direction with respect to the standard image
8: 1.5 pixel in the horizontal direction and 1.5 pixel in the vertical direction with respect to the standard image The above 1 to 8 are the pixels that form the images acquired by capturing images by shifting to the respective positions.

Hatching in FIG. 2 indicates empty pixels.

The position-displacement-distribution calculating portion 10 divides the Gr-channel combined image and the Gb-channel combined image into small regions, and calculates a position displacement amount for each of corresponding small regions.

Figure 3B:
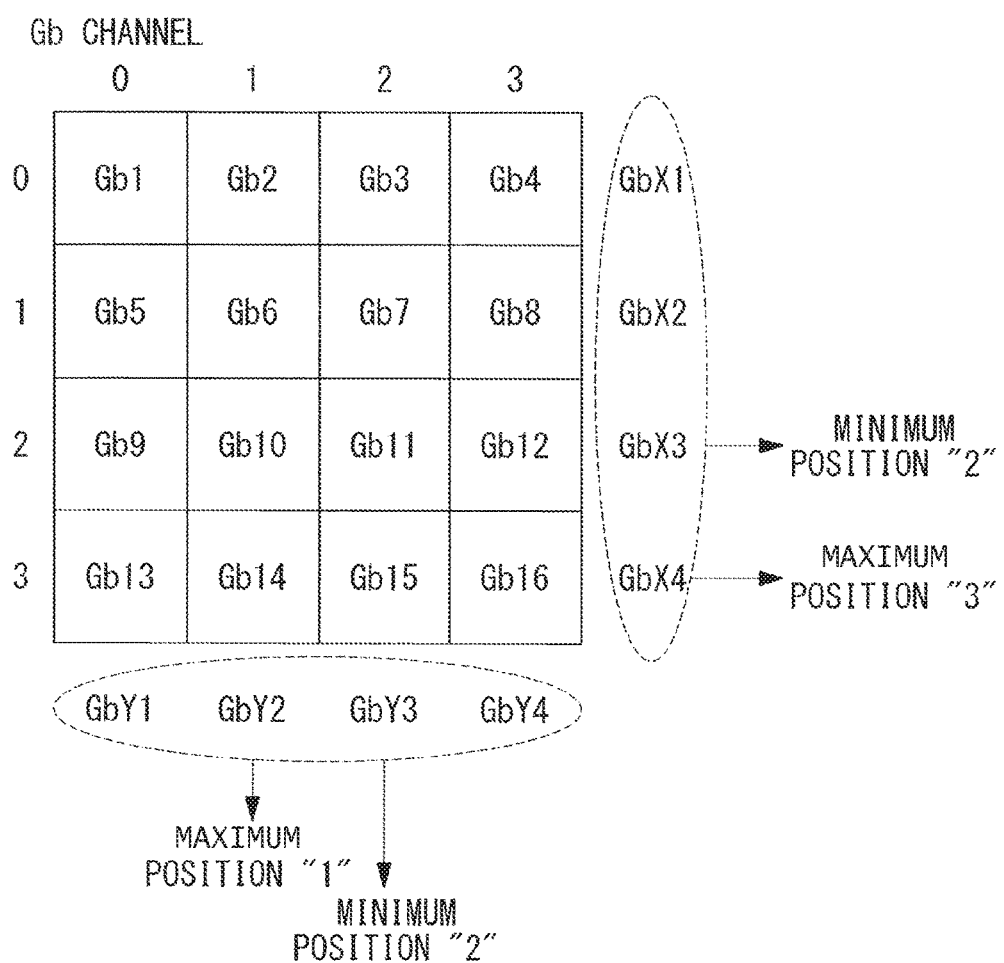
FIG. 3B is a diagram showing an example of a region of interest for a Gb channel similar to that in FIG. 3A, and also showing the relationship with respect to the sum of the pixels.

For example, in the example shown in FIGS. 3A and 3B, by interpolating the high-resolution image in which the eight images are combined, a region of interest formed of a 4×4-pixel small region is set at positions of the same pixels in the Gr-channel combined image and Gb-channel combined image by using an all-pixel interpolated image in which all of the pixels have pixel values.

Then, in the region of interest, pixel values of the four pixels that are arrayed in the horizontal direction and the vertical direction are added up, and positions of a minimum value and a maximum value are calculated from the summed values for the respective directions, that is, the horizontal direction and the vertical direction. As the information indicating the positions, continuous numbers (continuous numbers starting from "0" in the case of the example shown in the figures) are assigned in accordance with the direction in which addition is performed.

Addition is performed as follows.

<Horizontal Direction for Gr>

$$GrX1 = Gr1 + Gr2 + Gr3 + Gr4$$

$$GrX2 = Gr5 + Gr6 + Gr7 + Gr8$$

$$GrX3 = Gr9 + Gr10 + Gr11 + Gr12$$

$$GrX4 = Gr13 + Gr14 + Gr15 + Gr16$$

Here, it is assumed that the minimum value of the summed values is GrX1, and that the maximum value is GrX2. Therefore, the minimum position is 0, and the maximum position is 1.

<Horizontal Direction for Gb>

$$GbX1 = Gb1 + Gb2 + Gb3 + Gb4$$

$$GbX2 = Gb5 + Gb6 + Gb7 + Gb8$$

$$GbX3 = Gb9 + Gb10 + Gb11 + Gb12$$

$$GbX4 = Gb13 + Gb14 + Gb15 + Gb16$$

Here, it is assumed that the minimum value of the summed values is GbX3, and that the maximum value is GbX4. Therefore, the minimum position is 2, and the maximum position is 3.

<Vertical Direction for Gr>

$$GrY1 = Gr1 + Gr5 + Gr9 + Gr13$$

$$GrY2 = Gr2 + Gr6 + Gr10 + Gr14$$

$$GrY3 = Gr3 + Gr7 + Gr11 + Gr15$$

$$GrY4 = Gr4 + Gr8 + Gr12 + Gr16$$

Here, it is assumed that the minimum value of the summed values is GrY1, and that the maximum value is GrY4. Therefore, the minimum position is 0, and the maximum position is 3.

<Vertical Direction for Gb>

$$GbY1 = Gb1 + Gb5 + Gb9 + Gb13$$

$$GbY2 = Gb2 + Gb6 + Gb10 + Gb14$$

$$GbY3 = Gb3 + Gb7 + Gb11 + Gb15$$

$$GbY4 = Gb4 + Gb8 + Gb12 + Gb16$$

Here, it is assumed that the minimum value of the summed values is GbY2, and that the maximum value is GbY3. Therefore, the minimum position is 2, and the maximum position is 1.

From the above-described four sets of minimum positions and maximum positions, the position-displacement-distribution calculating portion 10 calculates and outputs an X-direction minimum position displacement amount, an X-direction maximum position displacement amount, a Y-direction minimum position displacement amount, and a Y-direction maximum position displacement amount.

In the above-described example,
X-direction minimum position displacement amount: $|0-2|=2$;
X-direction maximum position displacement amount: $||1-3|=2$;
Y-direction minimum position displacement amount: $|0-2|=2$; and
Y-direction maximum position displacement amount: $|3-1|=2$.

The correlation-level calculating portion 11 calculates the sum of the position displacement amounts transmitted thereto from the position-displacement-distribution calculating portion 10, and calculates a correlation level in accordance with that summed value.

Specifically,

Correlation level=[maximum position displacement amount]−[total position displacement amount].

In the example shown in FIGS. 3A and 3B, because the maximum position displacement amount is 12 and the total position displacement amount is 8, a correlation level of 4 is output.

Figure 4:
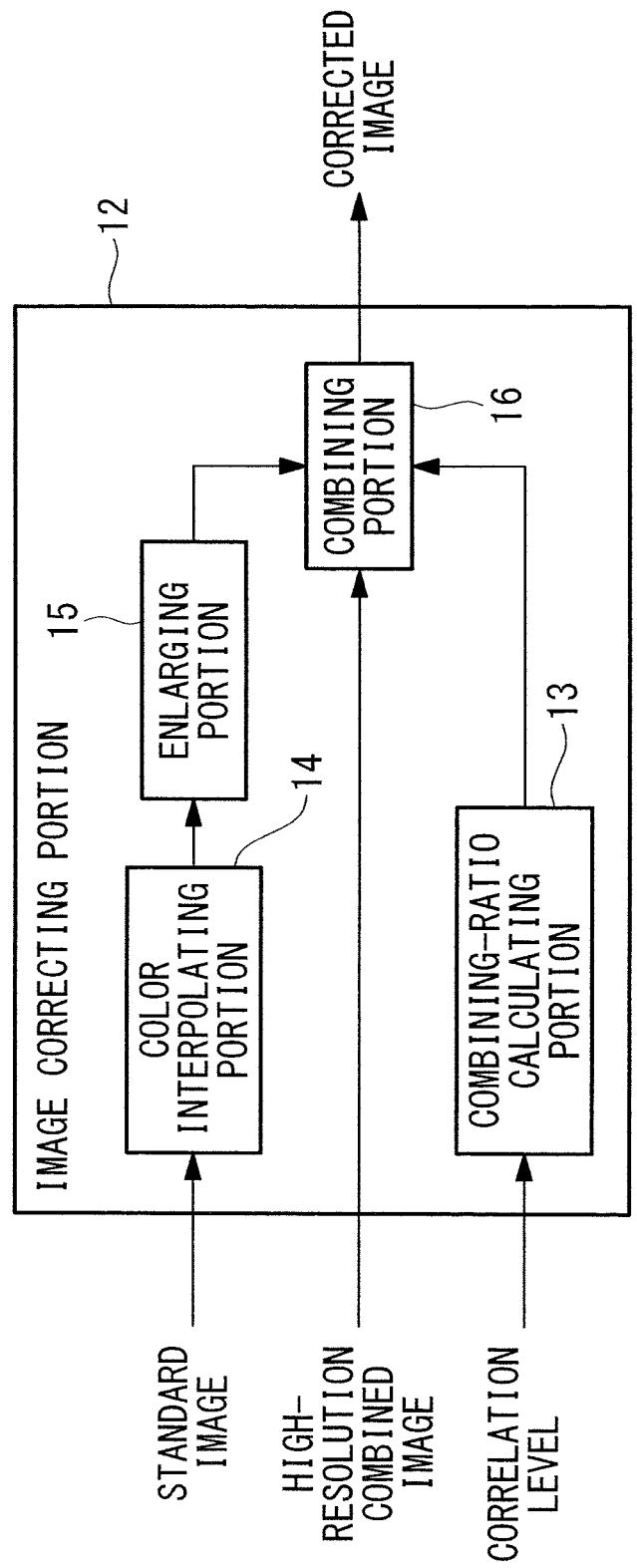
FIG. 4 is a block diagram showing an image correcting portion provided in the image-processing device of the imaging device in FIG. 1.

As shown in FIG. 4, the image correcting portion 12 is provided with: a combining-ratio calculating portion 13 that calculates a combining ratio on the basis of the correlation level output from the correlation-level calculating portion 11; a color interpolating portion 14 that performs colorization by demosaicing RAW data of the standard image stored in the memory 4; an enlarging portion 15 that enlarges the colorized standard image to the same image size as that of the combined image; and a combining portion 16 that combines the combined image generated by the high-resolution combining portion 9 and the enlarged standard image in accordance with the combining ratios calculated by the combining-ratio calculating portion 13.

Figure 5:
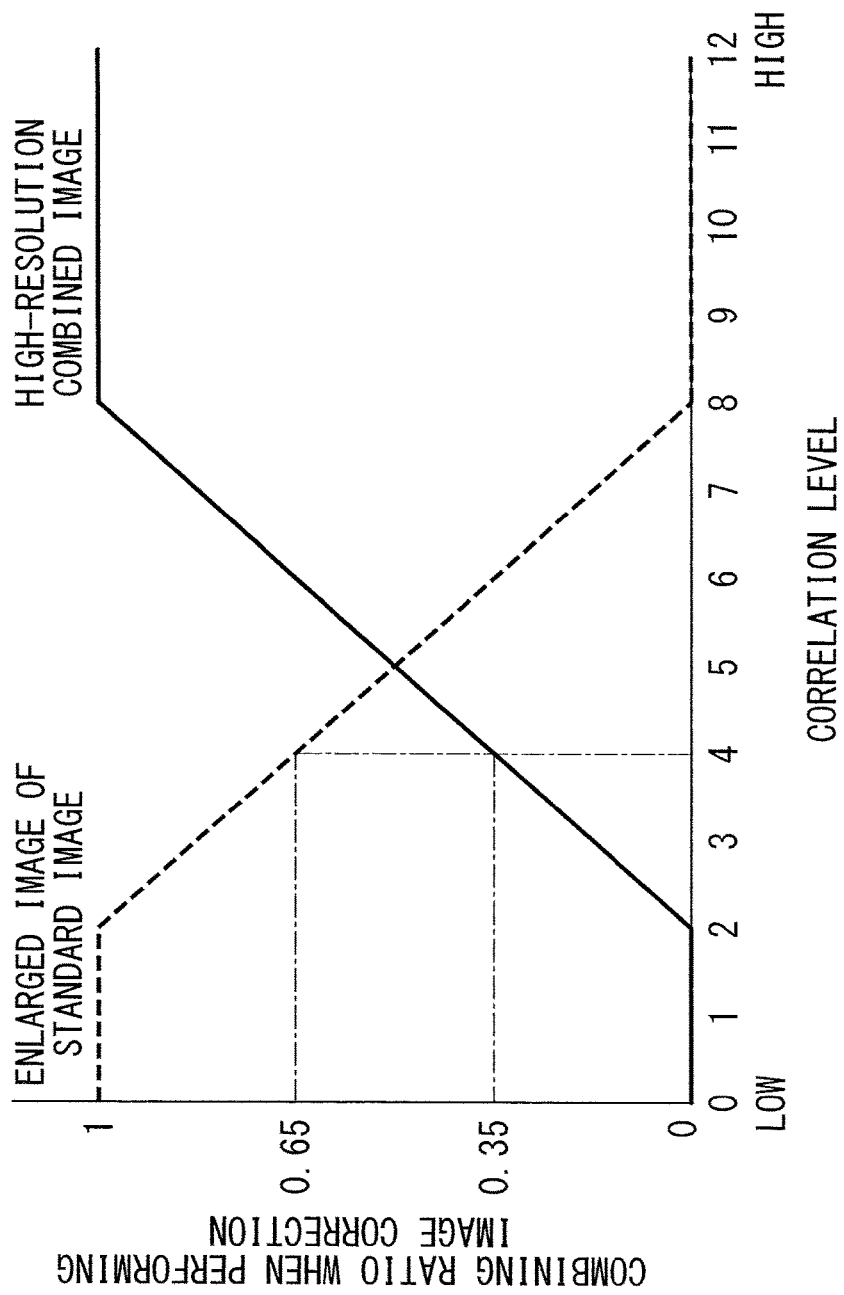
FIG. 5 is a diagram showing an example of a map that is used when the image correcting portion in FIG. 4 calculates a combining ratio on the basis of a correlation level.

The combining-ratio calculating portion 13 is provided with a map in which the correlation level and the combining ratio are associated with each other. FIG. 5 shows an example of the map.

In the map, the combining ratio of the combined image is increased with an increase in the correlation level, and the combining ratio of the standard image is increased with a decrease in the correlation level.

When the correlation level is 4, the combining ratio of the standard image is 0.65, and the combining ratio of the combined image is 0.35.

This processing is applied to all of the regions of interest corresponding to the individual pixels.

The operation of the thus-configured imaging device 1 and image-processing device 3 according to this embodiment will be described below.

When images of an imaging subject are captured by using the imaging device 1 according to this embodiment, a total of eight images, including one standard image and seven reference images, are acquired while the sensor shifting mechanism 7 shifts the imaging element 6 on the basis of the instruction signals from the sensor shifting control portion 8.

After the acquired eight images are stored in the memory 4, an image-processing method according to the embodiment of the present invention is performed.

Figure 6:
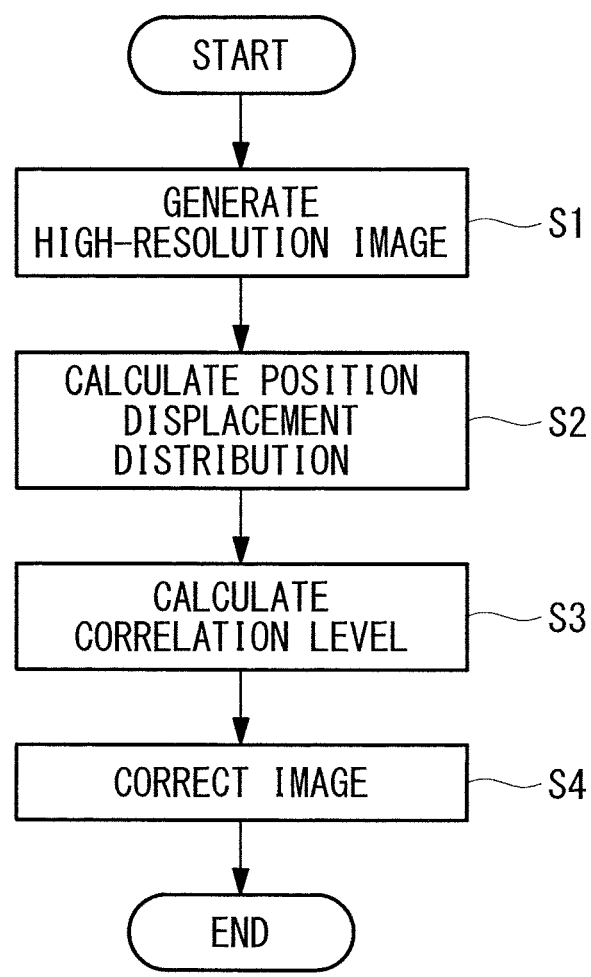
FIG. 6 is a flowchart showing an example of an image-processing method according to an embodiment of the present invention.

As shown in FIG. 6, the image-processing method according to this embodiment starts by outputting the eight images stored in the memory 4 to the high-resolution combining portion 9. In the high-resolution combining portion 9, the eight images are placed in the individual pixels in the high-resolution image space in accordance with the color channels on the basis of the shift control information transmitted from the sensor shifting control portion 8, thus generating the high-resolution combined images for the respective color channels (high-resolution combining step S1).

Next, of the generated high-resolution combined images, Gr- and Gb-combined images are transmitted to the position-displacement-distribution calculating portion 10, and the distribution of the position displacement amounts is calculated (position-displacement-distribution calculating step S2). In the position-displacement-distribution calculating portion 10, the Gr- and Gb-combined images are divided into small regions, and the X-direction minimum position displacement amount, the X-direction maximum position displacement amount, the Y-direction minimum position displacement amount, and the Y-direction maximum position displacement amount are calculated for each small region. The reason why the Gr- and Gb-combined images are used is that the pixel values thereof are relatively easily compared because these images are based on pixels in which color filters having similar colors are provided; however, there is no limitation thereto. The position displacement amounts may be determined by using combined images of pixels corresponding to the color filters having other colors.

The distributions of the four types of calculated position displacement amounts are transmitted to the correlation-level calculating portion 11, and the correlation levels are calculated for the individual small regions (correlation-level calculating step S3). The distribution of the calculated correlation levels is transmitted to the image correcting portion 12.

In the image correcting portion 12, the combining-ratio calculating portion 13 calculates the combining ratios for the individual small regions on the basis of the correlation levels transmitted thereto.

In addition, in the image correcting portion 12, the color interpolating portion 14 applies demosaicing to the standard image read out from the memory 4, and the enlarging portion 15 enlarges the standard image to the same image size as that of the combined image. Then, in the combining portion 16, the combined image of the four color channels transmitted from the high-resolution combining portion 9 and the enlarged standard image are combined on the basis of the combining ratios calculated by the combining-ratio calculating portion 13, and thus, a corrected combined image is generated (image correcting step S4).

As has been described above, with the imaging device 1, the image-processing device 3, and the image-processing method according to this embodiment, unlike the related art in which the combining ratios are set on the basis of the differences between the standard image and the reference images, the combining ratios are calculated on the basis of the distribution of the position displacement amounts of the Gr- and Gb-combined images, and therefore, there is an advantage in that, even in a situation in which the differences are small and masked by noise, such as the case in which pixel values are low or movements are subtle, it is possible to more reliably prevent the occurrence of artifacts due to movement and position displacement of the imaging subject, and it is possible to enhance the image resolution.

Figure 7:
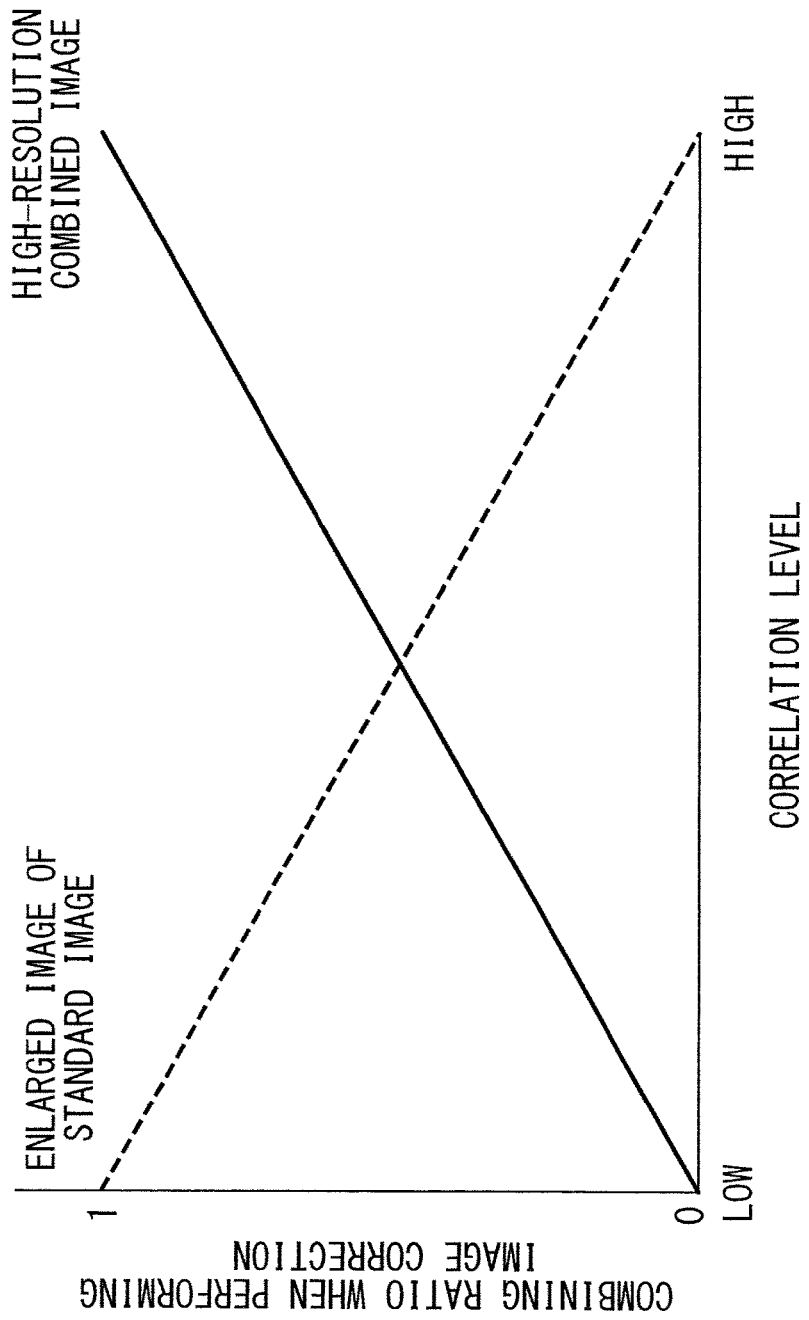
FIG. 7 is a diagram showing a modification of the map in FIG. 5.

Note that, as shown in FIG. 5, although this embodiment employs the map with which the combined image is corrected so that only the standard image is used in the case in which the correlation level is equal to or less than a first threshold "2", and so that only the combined image is used in the case in which the correlation level is equal to or greater than a second threshold "8", alternatively, as shown in FIG. 7, a map in which combining ratios for both of the images exist for all correlation levels may be employed.

Figure 8:
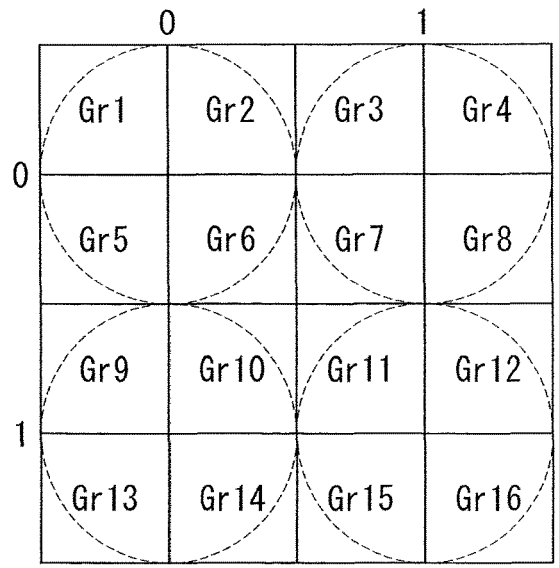
FIG. 8 is a diagram showing a modification of FIG. 3A.
Figure 9:
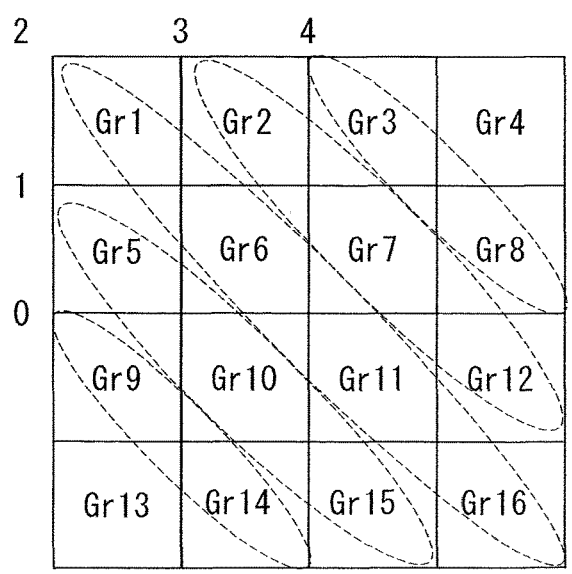
FIG. 9 is a diagram showing another modification of FIG. 3A.
Figure 10:
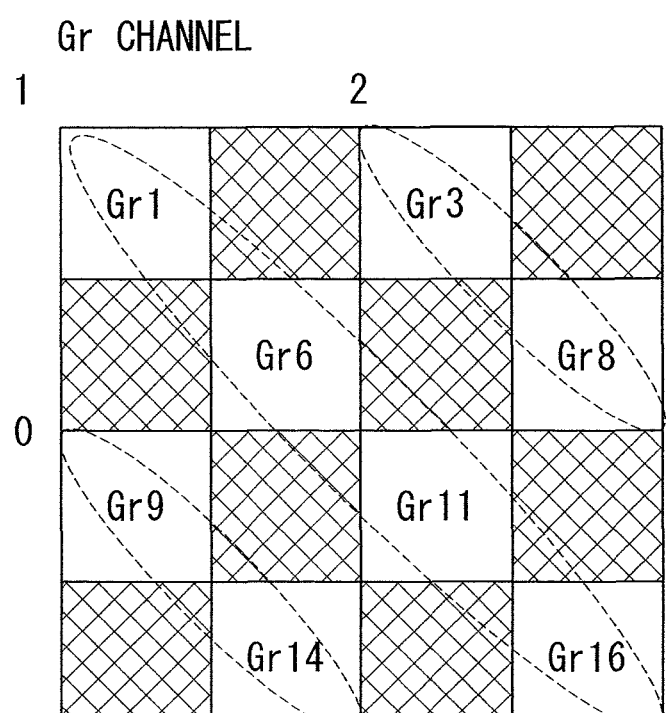
FIG. 10 is a diagram showing another modification of FIG. 3A.

In addition, although, in the position-displacement-distribution calculating portion 10, the minimum position displacement amount and the maximum position displacement amount are calculated by adding up the pixel values in the horizontal direction and the vertical direction, alternatively, as shown in FIG. 8, the small regions may be divided into even smaller rectangular regions, and the minimum position displacement amount and the maximum position displacement amount may be calculated by adding up or averaging the pixel values in the rectangular regions. In addition, as shown in FIG. 9, the minimum position displacement amount and the maximum position displacement amount may be calculated by averaging the pixel values in diagonal directions. Furthermore, as shown in FIG. 10, only the pixels that have been placed may be used without using the pixels that are interpolated when generating the combined images in the high-resolution combining portion 9. Hatched pixels in the figures indicate the pixels for which pixel placement is not performed.

Furthermore, although the differences between the maximum position displacement amounts and the total position displacement amounts have been used as the correlation levels, total numbers of the total position displacement amounts including peripheral regions of interest may be used as the correlation levels.

Figure 11:
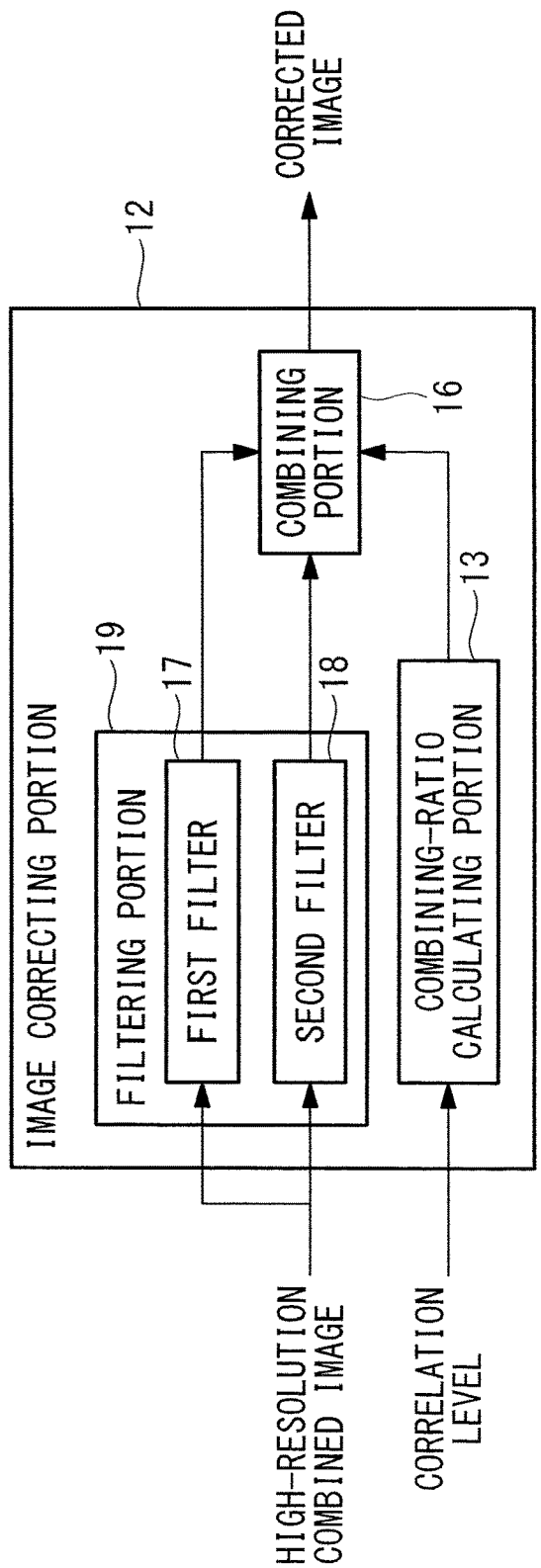
FIG. 11 is a block diagram showing a modification of the image correcting portion in FIG. 4.

In addition, in this embodiment, although the combined image is corrected by combining the standard image and the combined image in accordance with the combining ratios calculated by the combining-ratio calculating portion 13, alternatively, as shown in FIG. 11, the combined image may be subjected to processing performed by a filtering portion 19 provided with two types of filters (first and second filters) 17 and 18 having different low-pass effects, and the filtered images may be combined in accordance with the combining ratios calculated by the combining-ratio calculating portion 13 without using the standard image. By doing so, the image is made blurry by increasing the combining ratio of the image processed by the filter 17 having a high low-pass effect in the regions in which the correlation levels are low, the combining ratio of the image processed by the filter 18 having a low low-pass effect is increased in the regions in which the correlation levels are high, and thus, it is possible to acquire a clear image.

By doing so also, there is an advantage in that it is possible to effectively suppress the occurrence of artifacts due to the movement and the position displacement of the imaging subject. Note that the filter 18 having the low low-pass effect is assumed to include a case in which the combined image is output without modification (without filtering).

Figure 12:
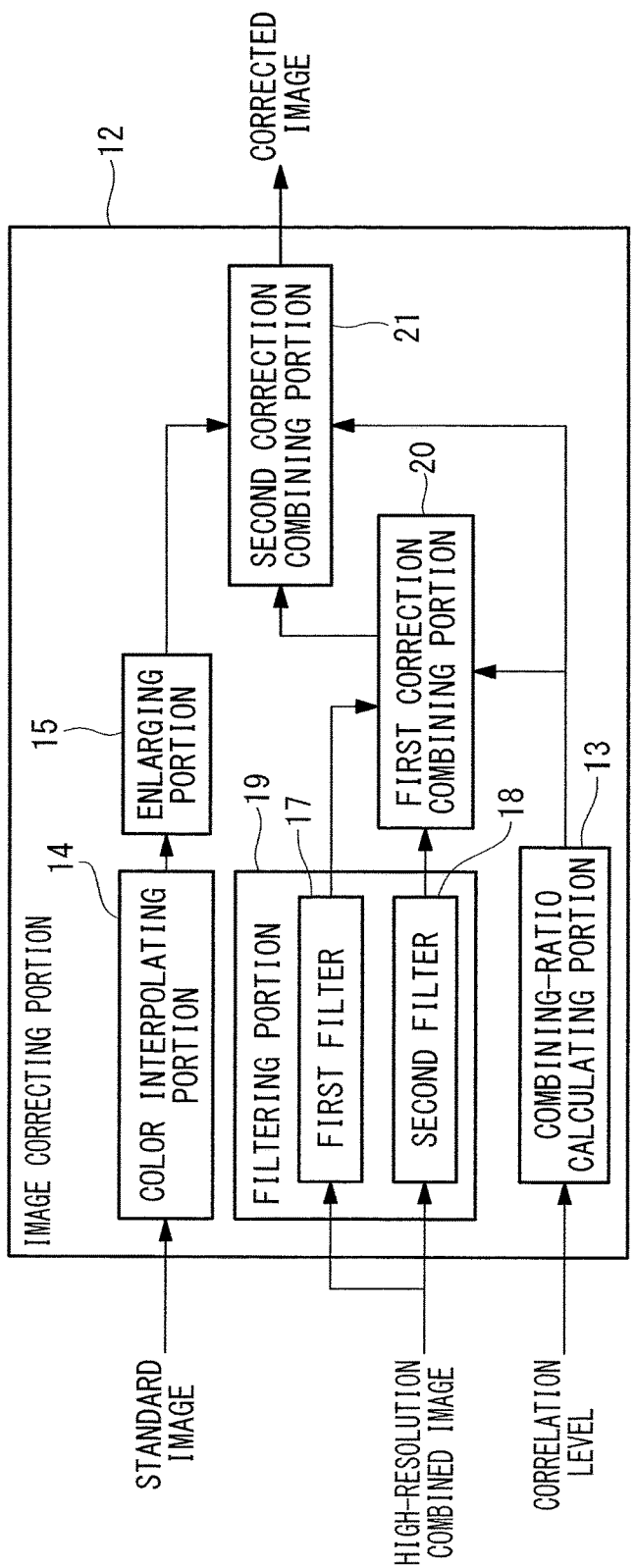
FIG. 12 is a block diagram showing another modification of the image correcting portion in FIG. 4.

Furthermore, as shown in FIG. 12, it is permissible to provide a first correction combining portion 20 that performs first correction in which the two images processed by the two types of filters 17 and 18 having different low-pass effects are combined in accordance with the combining ratios calculated by the combining-ratio calculating portion 13, and a second correction combining portion 21 that performs second correction in which the image resulting from the first correction and the standard image are combined in accordance with the combining ratios calculated by the combining-ratio calculating portion 13. The maps of the combining ratios used in the first correction and the second correction may be the same or different.

In addition, in this embodiment, although the high-resolution combining portion 9 performs placement in the high-resolution image space for each color channel, while performing positioning, on the basis of the shift control information from the sensor shifting control portion 8 of the image-acquisition portion 2, alternatively, the displacement amounts may be detected by calculating, between images, global movement amounts of the images as a whole or local movement amounts of the respective regions by using the plurality of images saved in the memory 4, and a high-resolution image may be generated on the basis of the detected displacement amounts. For example, movement vectors of the horizontal direction and the vertical direction are acquired by using block matching or the like for individual blocks wherein one block is constituted of 32×32 pixels. The movement information to be acquired may not be only the movements in the horizontal direction and the vertical direction but also the rotating direction or changes due to enlargement/reduction.

In addition, in addition to the case of being executed by the image-processing device 3 constituted of circuits, it is possible to perform the image-processing method according to this embodiment by means of an image-processing program that can be executed by a computer. In this case, the image-processing method according to this embodiment is performed by a processor, such as a CPU or the like, executing the image-processing program.

Specifically, the image-processing program stored in a storage medium is read out, and the read-out image-processing program is executed by the processor such as a CPU or the like. Here, the storage medium stores programs, data, or the like, and the function thereof is realized by an optical disc (DVD, CD, or the like), a hard disk drive, a memory (a card-type memory, a ROM, or the like), or the like.

Figure 13:
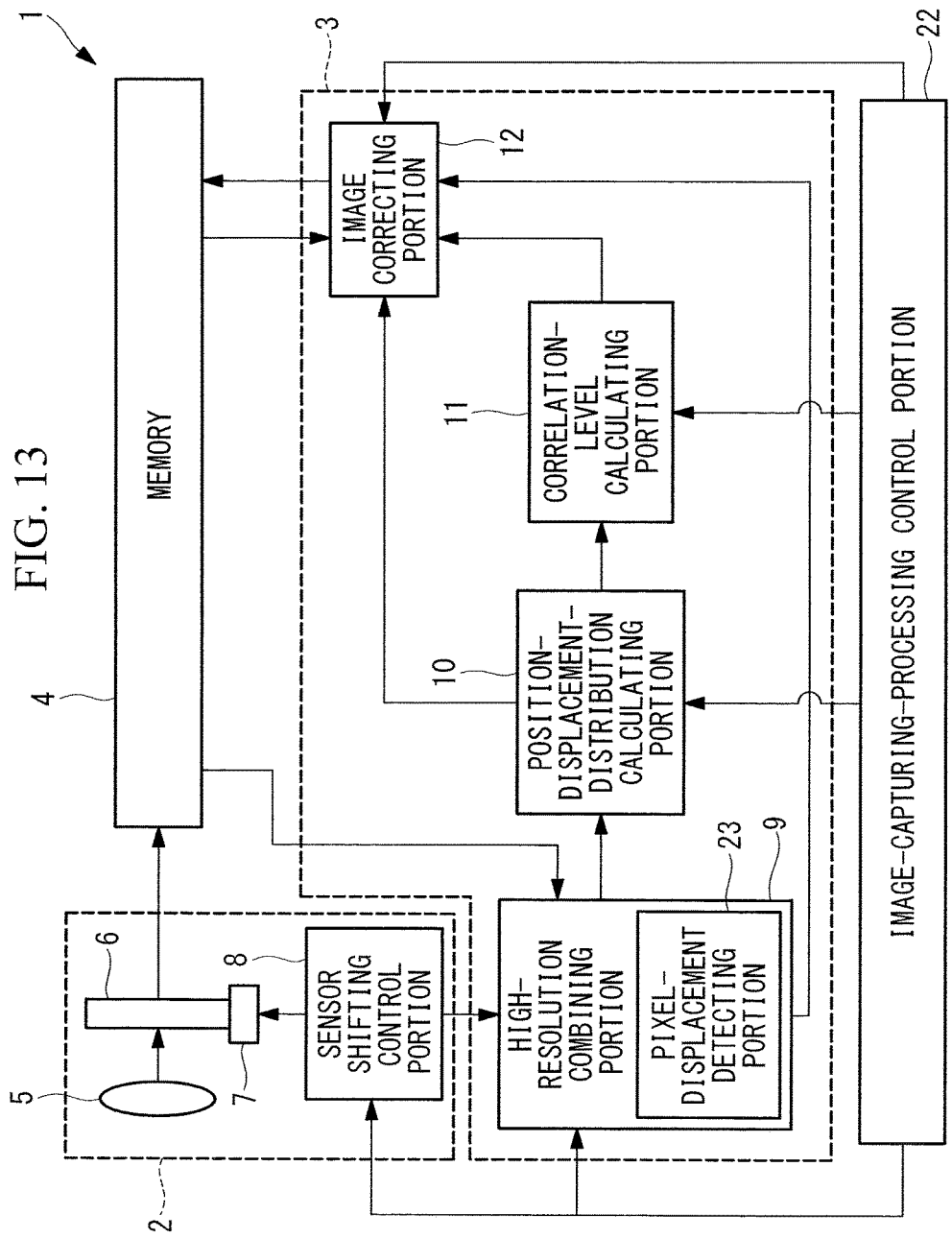
FIG. 13 is a block showing a modification of the imaging device in FIG. 1.

In addition, as shown in FIG. 13, this embodiment may be provided with an image-capturing-processing control portion 22 that controls the sensor shifting control portion 8, the high-resolution combining portion 9, the position-displacement-distribution calculating portion 10, the correlation-level calculating portion 11, and the image correcting portion 12.

Figure 14A:
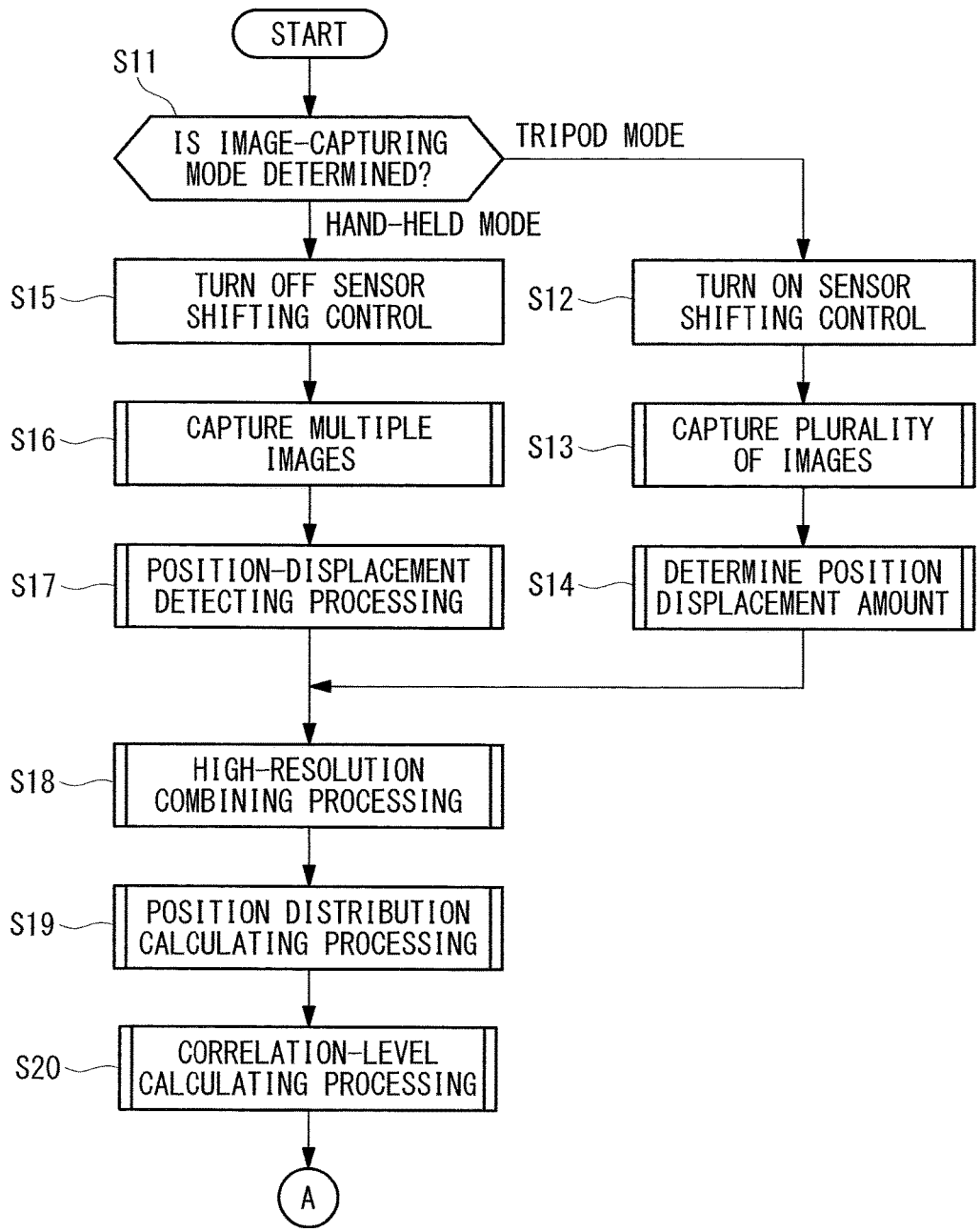
FIG. 14A is a flowchart showing a portion of an image-processing method performed by the imaging device in FIG. 13.

As shown in FIG. 14A, the image-capturing-processing control portion 22 determines the image-capturing mode (step S11), sets the sensor shifting control portion 8 to ON in the case in which the image-capturing mode is a tripod mode (step S12) and causes the sensor shifting control portion 8 to capture a plurality of images (step S13), and shift control information among the images from the sensor shifting control portion 8 is transmitted to the high-resolution combining portion 9 (step S14).

The image-capturing-processing control portion 22 sets the sensor shifting control portion 8 to OFF in the case in which the image-capturing mode is the hand-held mode (step S15) and causes the sensor shifting control portion 8 to capture a plurality of images (step S16), the plurality of images are transmitted to a pixel-displacement detecting portion 23 of the high-resolution combining portion 9, and thus, the displacement amounts are detected (step S17).

Because it suffices that images are captured so that movements occur among a plurality of images, the sensor shifting control portion 8 may be set to ON even in the hand-held mode.

Subsequently, the image-capturing-processing control portion 22 causes the high-resolution combining portion 9 to combine the plurality of images (high-resolution combining step S18), causes the position-displacement-distribution calculating portion 10 to calculate position displacement distributions from the Gr- and Gb-combined images that have been combined (position-displacement-distribution calculating step S19), and causes the correlation-level calculating portion 11 to calculate the correlation levels (correlation-level calculating step S20).

The image-capturing-processing control portion 22 is configured so as to set the map for determining the combining ratios to be used for image correction on the basis of ISO sensitivity, exposure variability, and flicker.

Figure 14B:
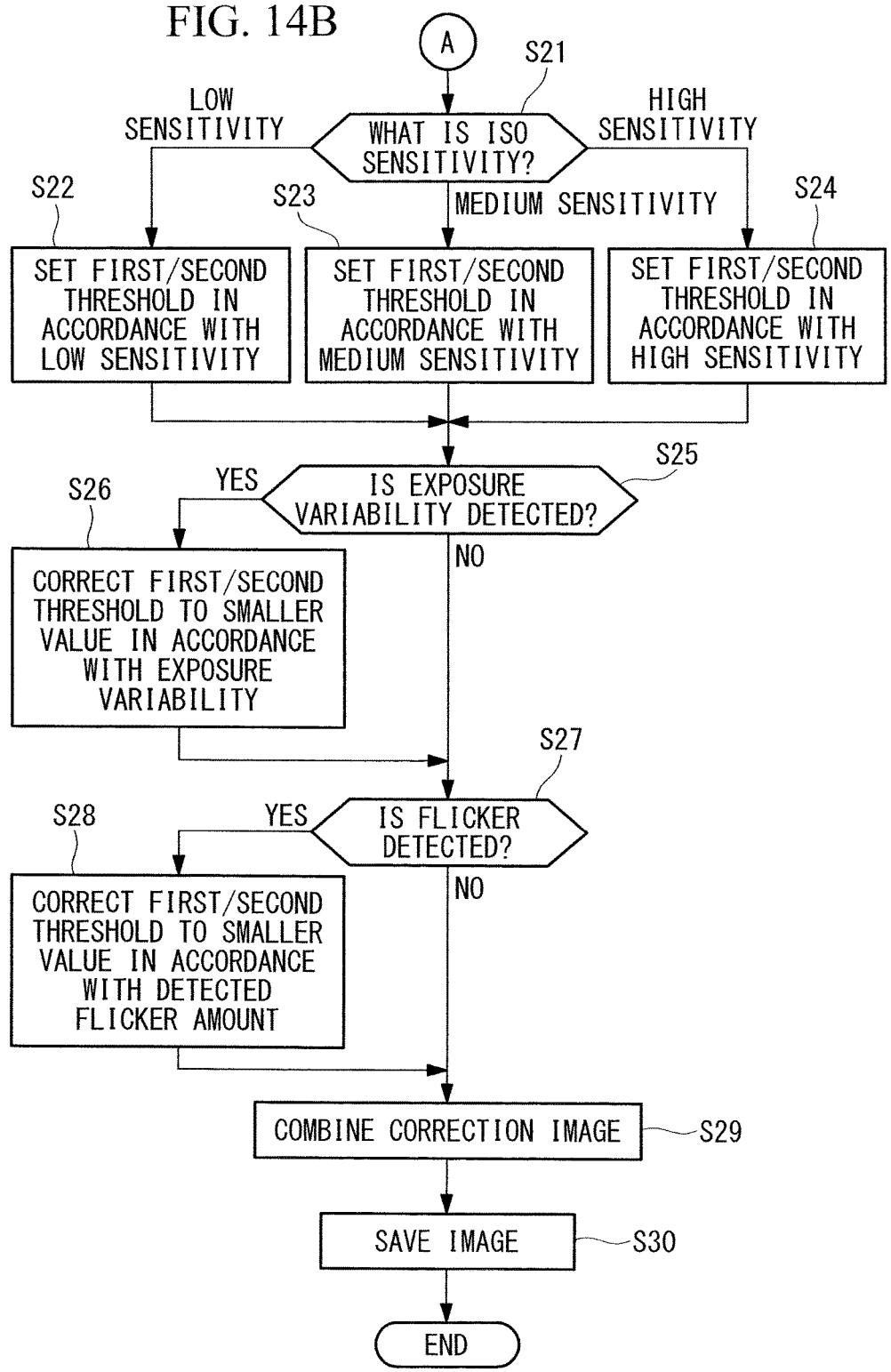
FIG. 14B is a flowchart of the image-processing method performed by the imaging device in FIG. 13, which is a continuation from FIG. 14A.

First, as shown in FIG. 14B, the image-capturing-processing control portion 22 acquires, from the image-acquisition portion 2, the ISO sensitivity when capturing a plurality of images, and selects a map in which a first threshold and a second threshold are different depending on whether the ISO sensitivity corresponds to a low-sensitivity, a medium-sensitivity, or a high-sensitivity (step S21). Because noise is increased with an increase in the ISO sensitivity, the first threshold and the second threshold are decreased so that the combining ratio of the combined image or the combined image to which the filter 18 having the low low-pass effect has been applied is set to be high (steps S22, S23, and S24).

Next, the image-capturing-processing control portion 22 detects the presence/absence of the exposure variability among the images when capturing the plurality of images (step S25), and, in the case in which the exposure variability is detected, adjusts the first threshold and the second threshold, which have been set as described above, in accordance with the detected exposure variability so as to decrease the first threshold and the second threshold (step S26). Because a level difference is generated when the exposure variability is increased, the combining ratio of the combined image of the combined image to which the filter 18 having the low low-pass effect has been applied is set to be high by decreasing the first threshold and the second threshold.

Furthermore, the image-capturing-processing control portion 22 detects the presence/absence of flicker among the images when capturing the plurality of images (step S27) and, in the case in which flicker is detected, adjusts the first threshold and the second threshold, which have been set as described above, in accordance with the detected flicker amount so as to decrease the first threshold and the second threshold (step S28). Because a level difference is also generated when the flicker amount is increased, the combining ratio of the combined image or the combined image to which the filter 18 having the low low-pass effect has been applied is set to be high by decreasing the first threshold and the second threshold; the combined image is corrected (image correcting step S29); and the corrected combined image is saved (step S30).

By using the thus-set map in the image correcting portion 12, even in a situation in which the differences are small and masked by noise, such as the case in which the pixel values are low or movements are subtle, it is possible to more reliably prevent the occurrence of artifacts due to movement and position displacement of the imaging subject, and it is possible to enhance the image resolution.

Note that the image-capturing-processing control portion 22 may change the method by which image correction is performed in the image correcting portion 12.

As a result, the above-described embodiment leads to the following aspects.

An aspect of the present invention is an image-processing device including: a high-resolution combining portion that generates a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating portion that calculates a distribution of position displacements between two comparative images that are individually formed of pixels corresponding to the different types of color filters in the combined image generated by the high-resolution combining portion; a correlation-level calculating portion that calculates, for individual pixels, correlation levels between the two comparative images on the basis of the distribution of the position displacements calculated by the position-displacement-distribution calculating portion; and an image correcting portion that corrects the combined image on the basis of the correlation levels calculated by the correlation-level calculating portion.

With this aspect, when the standard image and the one or more reference images acquired by capturing the images of the imaging subject in time series are input, the high-resolution combining portion generates the combined image having a greater resolution than those of the standard image and the reference images. Then, the position-displacement-distribution calculating portion calculates the distribution of the position displacements between the two comparative images formed of the pixels corresponding to the different types of color filters in the imaging element included in the combined image; the correlation-level calculating portion calculates, for the individual pixels, the correlation levels between the two comparative images on the basis of the distribution of the position displacements; and the combined image is corrected on the basis of the calculated correlation levels.

In other words, unlike the image-processing device in the related art in which the similarities are determined by using the differences between the standard image and the reference images for the individual regions, the correlation levels between the two comparative images are determined on the basis of the distribution of the position displacements, and therefore, the correlation levels between the two comparative images are reliably calculated even in the case in which the pixel values are low without being masked by noise as it occurs with the differences, and thus, it is possible to acquire a high-resolution combined image in which the occurrence of artifacts due to movement and position displacement of the imaging subject is suppressed.

In the above-described aspect the image correcting portion may correct the combined image by combining the combined image and the standard image by using combining ratios based on the correlation levels calculated by the correlation-level calculating portion.

By doing so, in the case in which the correlation levels are high, because movement and position displacement of the imaging subject are small, the occurrence of artifacts is prevented even if the images are combined without modification, and thus, it is possible to acquire a high-resolution image by increasing the combining ratio of the combined image. On the other hand, in the case in which the correlation levels are low, because movement and position displacement of the imaging subject are large, artifacts are expected to occur if the images are combined without modification, and thus, it is possible to suppress the occurrence of artifacts by increasing the combining ratio of the standard image.

In addition, in the above-described aspect, the image correcting portion may correct the combined image by combining two images, which are generated by applying filters having different low-pass effects to the combined image, by using the combining ratios based on the correlation levels calculated by the correlation-level calculating portion.

By doing so, in the case in which the correlation levels are high, because movement and position displacement of the imaging subject are small, the occurrence of artifacts is prevented even if the images are combined without modification, and thus, it is possible to acquire a high-resolution image in which blurriness is suppressed by increasing the combining ratio of the combined image to which the filter having a low low-pass effect is applied. On the other hand, in the case in which the correlation levels are low, because movement and position displacement of the imaging subject are large, artifacts are expected to occur if the images are combined without modification, and thus, it is possible to suppress the occurrence of artifacts by increasing blurriness by increasing the combining ratio of the combined image to which the filter having a high low-pass effect is applied.

In addition, in the above-described aspect, the image correcting portion may correct the combined image by means of first correction in which two images, which are generated by applying filters having different low-pass effects to the combined image, are combined by using the combining ratios based on the correlation levels calculated by the correlation-level calculating portion, and by means of second correction in which the image obtained by means of the first correction is combined with the standard image.

By doing so, it is possible to achieve both artifact suppression and high-resolution image acquisition by, in accordance with the correlation levels, increasing the combining ratio of one of the combined image to which the filter having the high low-pass effect is applied, the combined image to which the filter having the low low-pass effect is applied, and the standard image and by decreasing the other combining ratios.

In addition, in the above-described aspect, the position-displacement-distribution calculating portion may calculate, for each of the two comparative images, positions of a maximum value and a minimum value of values obtained by adding up or averaging pixel values of two or more pixels for a plurality of small regions formed of two or more individually corresponding pixels, and calculates displacement amounts at the positions of the maximum value and the minimum value for each of the small regions corresponding between the two comparative images.

By doing so, the influence of noise is suppressed by adding up or averaging the pixel values of the two or more pixels, and thus, it is possible to more reliably determine the correlation levels. It is possible to precisely calculate the correlation levels by means of addition or averaging in the case in which the numbers of pixels to be added up in the individual small regions are the same, and by means of averaging in the case in which the numbers of pixels are different.

In addition, in the above-described aspect, the position-displacement-distribution calculating portion may add up or average pixel values of a plurality of pixel groups formed of two or more pixels that are arrayed in one direction in the small regions.

By doing so, it is possible to easily calculate the distribution of the position displacements in a direction orthogonal to the arraying direction of the pixels in the pixel groups. In addition, in the case in which the pixels are longitudinally and laterally arrayed, it is possible to easily calculate the distribution of the position displacements for each of the longitudinal direction and the lateral direction or a diagonal direction.

In addition, in the above-described aspect, the position-displacement-distribution calculating portion may add up or average pixel values of two or more pixels of a plurality of rectangular regions in the small regions.

By doing so, it is possible to easily calculate the distribution of the position displacements in the arraying direction of the rectangular regions by dividing the small region into the plurality of rectangular regions.

In addition, in the above-described aspect, the correlation-level calculating portion may calculate the correlation levels that are decreased with an increase in the displacement amounts.

In addition, in the above-described aspect, the correlation-level calculating portion may calculate the number of the position displacements so as to serve as the displacement amounts. A greater number of the position displacements can be judged to indicate a greater displacement amount.

In addition, another aspect of the present invention is an imaging device including an image-acquisition portion that acquires a standard image and one or more reference images other than the standard image by capturing images of an imaging subject in time series by using an imaging element in which multiple types of color filters are arrayed in individual pixels; and any one of the above-described image-processing devices that processes the standard image and the reference images acquired by the image-acquisition portion.

In addition, another aspect of the present invention is an image-processing method including: a high-resolution combining step of generating a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating step of calculating a distribution of position displacements between two comparative images that are individually formed of pixels corresponding to the different types of color filters in the combined image generated in the high-resolution combining step; a correlation-level calculating step of calculating, for individual pixels, correlation levels between the two comparative images on the basis of the distribution of the position displacements calculated in the position-displacement-distribution calculating step; and an image correcting step of correcting the combined image on the basis of the correlation levels calculated in the correlation-level calculating step.

In addition, another aspect of the present invention is an image-processing program that causes a computer to execute: a high-resolution combining step of generating a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating step of calculating a distribution of position displacements between two comparative images that are individually formed of pixels corresponding to the different types of color filters in the combined image generated in the high-resolution combining step; a correlation-level calculating step of calculating, for individual pixels, correlation levels between the two comparative images on the basis of the distribution of the position displacements calculated in the position-displacement-distribution calculating step; and an image correcting step of correcting the combined image on the basis of the correlation levels calculated in the correlation-level calculating step.

In addition, another aspect of the present invention is a non-transitory computer-readable storage medium storing an image-processing program that causes a computer to execute: a high-resolution combining step of generating a combined image by combining a standard image and one or more reference images other than the standard image, which are acquired by capturing images of an imaging subject in time series by using an imaging element in which multiple types of color filters are arrayed in individual pixels, in a high-resolution space in which the resolution is greater than those of the standard image and the reference images; a position-displacement-distribution calculating step of calculating a distribution of position displacements between two comparative images that are individually formed of pixels corresponding to the different types of color filters in the combined image generated in the high-resolution combining step; a correlation-level calculating step of calculating, for individual pixels, correlation levels between the two comparative images on the basis of the distribution of the position displacements calculated in the position-displacement-distribution calculating step; and an image correcting step of correcting the combined image on the basis of the correlation levels calculated in the correlation-level calculating step.

The present invention affords an advantage in that it is possible to achieve both artifact suppression and resolution enhancement.

REFERENCE SIGNS LIST 1 imaging device
2 image-acquisition portion
3 image-processing device
6 imaging element
9 high-resolution combining portion 10 position-displacement-distribution calculating portion
11 correlation-level calculating portion
12 image correcting portion
17, 18 filter
S1, S18 high-resolution combining step
S2, S19 position-displacement-distribution calculating step
S3, S20 correlation-level calculating step
S4, S29 image correcting step.

The invention claimed is:

1. An image-processing device comprising:
an image processor comprising circuitry or a hardware processor that operates under control of a stored program, the image processor being configured to execute processes comprising:
a high-resolution combining process that generates a combined image by combining a standard image and at least one reference image other than the standard image, which are acquired by capturing images of an imaging subject in time series by using an imaging element in which multiple types of color filters are arrayed in individual pixels, in a high-resolution space in which a resolution is greater than resolutions of the standard image and the at least one reference image;
a position-displacement-distribution calculating process that calculates a distribution of position displacements between two comparative images that are individually formed of pixels corresponding to the multiple types of color filters in the combined image generated in the high-resolution combining process;
a correlation-level calculating process that calculates, for individual pixels, correlation levels between the two comparative images based on the distribution of the position displacements calculated in the position-displacement-distribution calculating process; and
an image correcting process that corrects the combined image based on the correlation levels calculated in the correlation-level calculating process,
wherein the position-displacement-distribution calculating process calculates, for each of the two comparative images, positions of a maximum value and a minimum value of values obtained by adding up or averaging pixel values of two or more pixels for a plurality of small regions formed of two or more individually corresponding pixels, and calculates displacement amounts at the positions of the maximum value and the minimum value for each of the small regions corresponding between the two comparative images.

2. The image-processing device according to claim 1, wherein the image correcting process corrects the combined image by combining the combined image and the standard image by using combining ratios based on the correlation levels calculated in the correlation-level calculating process.

3. The image-processing device according to claim 1, wherein the image correcting process corrects the combined image by combining two images, which are generated by applying filters having different low-pass effects to the combined image, by using combining ratios based on the correlation levels calculated in the correlation-level calculating process.

4. The image-processing device according to claim 1, wherein the image correcting process comprises (i) a first correction process in which two images, which are generated by applying filters having different low-pass effects to the combined image, are combined by using combining ratios based on the correlation levels calculated in the correlation-level calculating process, and (ii) a second correction process in which the image obtained in the first correction process is combined with the standard image.

5. The image-processing device according to claim 1, wherein the position-displacement-distribution calculating process adds up or averages pixel values of a plurality of pixel groups formed of two or more pixels that are arrayed in one direction in the small regions.

6. The image-processing device according to claim 1, wherein the position-displacement-distribution calculating process adds up or averages pixel values of two or more pixels of a plurality of rectangular regions in the small regions.

7. The image-processing device according to claim 1, wherein the correlation-level calculating process calculates the correlation levels that are decreased with an increase in the displacement amounts.

8. The image-processing device according to claim 7, wherein the correlation-level calculating process calculates a number of the position displacements so as to serve as the displacement amounts.

9. An imaging device comprising:
the image-processing device according to claim 1; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

10. An image-processing method comprising:
a high-resolution combining step of generating a combined image by combining a standard image and at least one reference image other than the standard image, which are acquired by capturing images of an imaging subject in time series by using an imaging element in which multiple types of color filters are arrayed in individual pixels, in a high-resolution space in which a resolution is greater than resolutions of the standard image and the at least one reference image;
a position-displacement-distribution calculating step of calculating a distribution of position displacements between two comparative images that are individually formed of pixels corresponding to the multiple types of color filters in the combined image generated in the high-resolution combining step;
a correlation-level calculating step of calculating, for individual pixels, correlation levels between the two comparative images based on the distribution of the position displacements calculated in the position-displacement-distribution calculating step; and
an image correcting step of correcting the combined image based on the correlation levels calculated in the correlation-level calculating step,
wherein the position-displacement-distribution calculating step comprises calculating, for each of the two comparative images, positions of a maximum value and a minimum value of values obtained by adding up or averaging pixel values of two or more pixels for a plurality of small regions formed of two or more individually corresponding pixels, and calculating displacement amounts at the positions of the maximum value and the minimum value for each of the small regions corresponding between the two comparative images.

11. A non-transitory computer-readable storage medium storing an image-processing program that causes a computer to execute:
a high-resolution combining process of generating a combined image by combining a standard image and at least one or mom reference image other than the standard image, which are acquired by capturing images of an imaging subject in time series by using an imaging element in which multiple types of color filters are arrayed in individual pixels, in a high-resolution space in which a resolution is greater than resolutions of the standard image and the at least one reference image;
a position-displacement-distribution calculating process of calculating a distribution of position displacements between two comparative images that are individually formed of pixels corresponding to the different types of color filters in the combined image generated in the high-resolution combining process;
a correlation-level calculating process of calculating, for individual pixels, correlation levels between the two comparative images based on the distribution of the position displacements calculated in the position-displacement-distribution calculating process; and
an image correcting process of correcting the combined image based on the correlation levels calculated in the correlation-level calculating process,
wherein the position-displacement-distribution calculating process calculates, for each of the two comparative images, positions of a maximum value and a minimum value of values obtained by adding up or averaging pixel values of two or more pixels for a plurality of small regions formed of two or more individually corresponding pixels, and calculates displacement amounts at the positions of the maximum value and the minimum value for each of the small regions corresponding between the two comparative images.

12. An imaging device comprising:
the image-processing device according to claim 2; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

13. An imaging device comprising:
the image-processing device according to claim 3; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

14. An imaging device comprising:
the image-processing device according to claim 4; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

15. An imaging device comprising:
the image-processing device according to claim 5; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

16. An imaging device comprising:
the image-processing device according to claim 6; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

17. An imaging device comprising:
the image-processing device according to claim 7; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

18. An imaging device comprising:
the image-processing device according to claim 8; and
an image-acquisition portion comprising an imaging element that acquires the standard image and the at least one reference image other than the standard image by capturing the images of the imaging subject in time series by using the imaging element in which multiple types of color filters are arrayed in individual pixels,
wherein the image-processing device processes the standard image and the reference images acquired by the image-acquisition portion.

* * * * *